US008934183B2

(12) United States Patent
Maetaki

(10) Patent No.: US 8,934,183 B2
(45) Date of Patent: Jan. 13, 2015

(54) OPTICAL ELEMENT AND OPTICAL SYSTEM INCLUDING THE OPTICAL ELEMENT

(75) Inventor: Satoshi Maetaki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 1219 days.

(21) Appl. No.: 12/614,760

(22) Filed: Nov. 9, 2009

(65) Prior Publication Data

US 2010/0116973 A1 May 13, 2010

(30) Foreign Application Priority Data

Nov. 12, 2008 (JP) .................................. 2008-289649

(51) Int. Cl.
*G02B 9/00* (2006.01)
*B29D 11/00* (2006.01)
*G02B 1/12* (2006.01)
*G02B 7/02* (2006.01)
*G02B 13/00* (2006.01)
*G02B 13/22* (2006.01)

(52) U.S. Cl.
CPC .............. *B29D 11/0073* (2013.01); *G02B 1/12* (2013.01); *G02B 7/025* (2013.01); *G02B 13/0045* (2013.01); *G02B 13/006* (2013.01); *G02B 13/009* (2013.01); *G02B 13/22* (2013.01)
USPC ........... 359/797; 250/216; 359/741; 359/793; 359/796

(58) Field of Classification Search
CPC ...... G02B 1/12; G02B 13/006; G02B 13/009; G02B 13/22; G02B 13/0045; G02B 7/025; G02B 9/00; G01V 8/10; B29D 11/0073; H01L 31/0232
USPC ................. 250/216; 359/754–756, 757–769, 359/770–790, 642, 793–797
See application file for complete search history.

(56) References Cited

U.S. PATENT DOCUMENTS

| | | | | |
|---|---|---|---|---|
| 5,299,062 A | * | 3/1994 | Ogata | 359/571 |
| 5,566,027 A | * | 10/1996 | Saitoh et al. | 359/796 |
| 5,644,413 A | * | 7/1997 | Komma et al. | 369/44.23 |
| 6,816,322 B2 | * | 11/2004 | Abe et al. | 359/796 |
| 7,136,237 B2 | | 11/2006 | Ogawa | |
| 7,158,320 B2 | | 1/2007 | Nishio | |
| 7,193,789 B2 | | 3/2007 | Maetaki | |
| 7,649,699 B2 | * | 1/2010 | Ishibashi | 359/797 |

(Continued)

FOREIGN PATENT DOCUMENTS

JP 5-008231 A 1/1993
JP 2001-004920 A 1/2001

(Continued)

*Primary Examiner* — Kevin Pyo
*Assistant Examiner* — Kevin Wyatt
(74) *Attorney, Agent, or Firm* — Rossi, Kimms & McDowell LLP

(57) ABSTRACT

An optical element is provided, which is small in distortion when at least three optical members including a resin layer sandwiched by the optical members are cemented together, has a high environmental resistance and optical performance, and has an excellent chromatic aberration correction effect. In the optical element, the resin layer is formed on one of light incident/exit surfaces of a first optical member, and a second optical member is cemented to the resin layer by a bonding material. A condition of $\phi g < \phi r$ is satisfied where $\phi r$ indicates an outer diameter of the resin layer and $\phi g$ indicates an effective region diameter of a surface of the second optical member which is cemented to the resin layer.

17 Claims, 8 Drawing Sheets

(56) References Cited

U.S. PATENT DOCUMENTS

| | | | |
|---|---|---|---|
| 8,004,778 B2 * | 8/2011 | Matsumoto et al. | 359/795 |
| 8,134,788 B2 * | 3/2012 | Inoue et al. | 359/796 |
| 2003/0081331 A1 * | 5/2003 | Abe | 359/796 |
| 2003/0086184 A1 * | 5/2003 | Abe et al. | 359/796 |
| 2009/0040626 A1 * | 2/2009 | Oh et al. | 359/716 |
| 2009/0153794 A1 * | 6/2009 | Iyer et al. | 351/169 |
| 2011/0122513 A1 * | 5/2011 | Ishibashi et al. | 359/797 |

FOREIGN PATENT DOCUMENTS

| | | |
|---|---|---|
| JP | 2003-139916 A | 5/2003 |
| JP | 2003-147281 A | 5/2003 |
| JP | 2005-181392 A | 7/2005 |
| JP | 2005-352265 A | 12/2005 |
| JP | 2006-145823 A | 6/2006 |

* cited by examiner

OPTICAL ELEMENT AND OPTICAL SYSTEM INCLUDING THE OPTICAL ELEMENT

BACKGROUND OF THE INVENTION

1. Field of the Invention

The present invention relates to an optical element in which three or more optical elements are cemented together, and an optical system including the optical element, and is suitable for use in an optical system used for an optical apparatus such as a silver-halide film camera, a digital still camera, a video camera, a telescope, binoculars, a projector, or a copying machine.

2. Description of the Related Art

In recent years, an optical system used for an image pickup apparatus such as a digital camera or a video camera (image pickup optical system) is required to have a small total system size and high performance, with a reduction in size and improvement in function of the image pickup apparatus.

In the optical systems generally used for the image pickup apparatus such as the digital camera or the video camera (image pickup optical system), various aberrations increase as a total lens length is shortened and downsizing of the entire optical system is attained.

In particular, chromatic aberrations such as an on-axis chromatic aberration and a lateral chromatic aberration are increasingly caused. As a result, the optical performance significantly reduces. For example, in a case of a telephoto type optical system having a reduced total lens length, the chromatic aberrations increase as a focal length is extended (lengthened), resulting in significantly reducing the optical performance.

Up to now, optical systems using an optical member made of an optical material, for example, a resin which has strong extraordinary partial dispersion have been known as the optical systems having a reduced chromatic aberration (Japanese Patent Application Laid-Open Nos. 2005-181392, 2006-145823, and 2005-352265).

In the inventions disclosed in Japanese Patent Application Laid-Open Nos. 2005-181392, 2006-145823, and 2005-352265, the chromatic aberration of the optical member made of a resin material having strong extraordinary partial dispersion and being imparted with an optical power and the chromatic aberration of the optical member made of another glass material are suitably balanced with each other, to thereby excellently reduce the chromatic aberrations of the entire optical system.

Besides, as optical elements using the optical member made of the resin material, there are known a so-called combined optical element in which a resin layer is formed on a lens surface which has been polished into a spherical shape to provide an aspherical shape, a hybrid aspherical lens, and the like (Japanese Patent Application Laid-Open Nos. H05-008231 and 2001-004920).

In the inventions disclosed in Japanese Patent Application Laid-Open Nos. H05-008231 and 2001-004920, in order to form the aspherical shape on the lens surface, a resin is stacked on a lens which being a base. Then, an aspherical-shaped mold is pressed to the resin to form the lens surface having the aspherical shape.

Further, there are known an optical element in which distortion and peeling of the surface when the multiple optical members are cemented together are reduced, an optical element in which the contact between the resin and the glass is improved, an optical element in which the environmental resistance of the resin is increased, and the like (Japanese Patent Application Laid-Open Nos. 2003-139916 and 2003-147281).

In the method of forming the resin layer on the lens surface using the mold, a degree of difficulty of the formation increases as the resin layer becomes thicker. This is because the absolute amount of curing contraction at the time of formation increases as the amount of the resin increases. As a result, it is difficult to finish the resin surface with high precision. An absolute amount of a change in size of the resin layer to a change in temperature increases as the resin layer becomes thicker, and hence the influence on the optical performance becomes larger.

Japanese Patent Application Laid-Open Nos. 2005-181392, 2006-145823, and 2005-352265 discloses optical systems in which an optical element including a resin layer sandwiched by two lenses is used for chromatic aberration correction.

When the cemented optical element in which the resin layer is sandwiched by the lenses is to be manufactured, the resin layer is formed on a surface of one of the lenses, and then a surface of the resin is covered with a bonding material and the other of the lenses is bonded to the one of the lenses. With this, the influence of precision of the surface of the formed resin layer formed on the optical performance is minimized.

In view of environmental resistance, the cemented optical element has such a feature that deformation is hardly caused, because the surface of the resin layer is regulated by an external lens.

However, when the lenses of the cemented optical element are to be finally cemented to each other, cement distortion or cement peeling under environments may sometimes occur. In the inventions disclosed in Japanese Patent Application Laid-Open Nos. 2003-139916 and 2003-147281, in order to reduce the cement distortion or cement peeling of the lenses, the lenses are bonded to each other using an elastic member as a bonding material.

The bonding method described above is suited to cement two lenses, or to cement a lens and a plastic material to each other. However, an optical element including three optical members, particularly, an optical element manufactured by cementing, after formation of a resin layer on one of two lenses, the two lenses together with another one of the two lenses causes the following problem.

FIG. 14 is a principal cross-sectional view illustrating an optical element including three optical members cemented together. An optical element 14 illustrated in FIG. 14 has a structure in which a resin layer (optical member) NL1 is formed on an optical member L1, and then cemented to an optical member L2.

FIG. 15 is an enlarged schematic view illustrating a part of an outer region of the optical element 14 illustrated in FIG. 14. In view of the degree of difficulty of the formation and the environmental resistance, an absolute thickness of the resin layer NL1 is desirably minimized as much as possible.

Therefore, the thickness of an outer region of the resin layer NL1 along an optical axis 1 is more likely to become thinner than the thickness of a normal polished lens.

Thus, the optical members L1 and L2 are arranged very closely to each other in the outer region. This is remarkable particularly in the case where the resin layer NL1 has a positive power.

The inventors of the present invention found that, when an outer diameter $\phi r$ of the resin layer NL1 is smaller than a polishing diameter $\phi g$ of a cemented surface L2$b$ of the optical member L2 as illustrated in FIG. 15 in a state described above, a bonding material S1 used to cement the optical members L1 and L2 together enters between the optical members L1 and L2.

When the bonding material S1 enters between the optical members L1 and L2, the thickness of the bonding material S1 significantly differs between a region having a diameter equal to or smaller than the outer diameter φr and a region having a difference between the diameters φr and φg (band region). Therefore, the absolute amount of curing contraction of the bonding material S1 significantly differs, and hence an optical surface of the optical member L1 or L2 is distorted, to thereby greatly affect the optical performance.

The inventors of the present invention found that the bonding material S1 is more likely to enter between the optical members L1 and L2 in an outer-diameter position of the optical member L1, in which the optical members L1 and L2 are closest to each other, resulting in inducing large distortion.

SUMMARY OF THE INVENTION

It is an object of the present invention to provide an optical element in which distortion caused when at least three optical members including a resin layer sandwiched by the optical members are cemented together to manufacture the optical element may be reduced, and in which an environmental resistance is high and optical performance and a chromatic aberration correction effect are excellent.

An optical element according to the present invention includes: a first optical member having two light incident/exit surfaces; a resin layer formed on one of the light incident/exit surfaces; a second optical member having a surface cemented to the resin layer; and a bonding material for cementing the second optical member to the resin layer, in which a condition of φg<φr is satisfied where φr indicates an outer diameter of the resin layer and φg indicates an effective region diameter of the surface of the second optical member which is cemented to the resin layer.

According to the present invention, the optical element is obtained in which distortion caused when at least the three optical members including the resin layer sandwiched by the optical members are cemented together to manufacture the optical element may be reduced, and in which the environmental resistance is high and the optical performance and the chromatic aberration correction effect are excellent.

Further features of the present invention become apparent from the following description of exemplary embodiments with reference to the attached drawings.

DESCRIPTION OF THE EMBODIMENTS

Hereinafter, an optical element according to the present invention and an optical system including the optical element are described.

The optical element according to the present invention includes at least three optical members which are integrally cemented, and has a predetermined optical power (0 in some cases).

At least one of the optical members is a resin layer obtained by forming a resin on one of light incident/exit surfaces of the other optical members (first and second optical members) using a mold.

The resin layer is sandwiched on both sides (light incident/exit surfaces) by the two optical members. When the optical element is to be manufactured, the resin layer is formed on the first optical member and then the second optical member is cemented to the other surface of the resin layer by a bonding material.

When φr indicates an outer diameter of the resin layer and φg indicates an effective region diameter of the surface on the side of the second optical member which is cemented to the resin layer, the following condition is satisfied.

$$\phi g < \phi r \quad (1)$$

Figure 1:
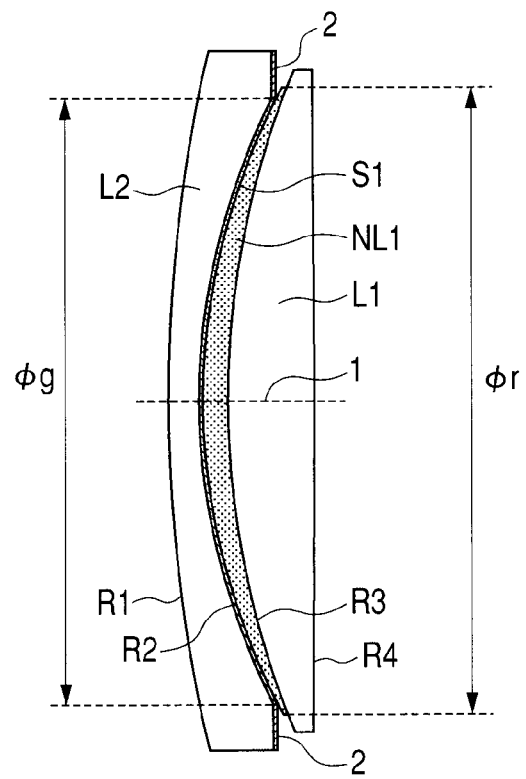
FIG. 1 is a cross-sectional view illustrating an optical element according to Embodiment 1 of the present invention.

FIG. 1 is a principal cross-sectional view illustrating an optical element according to Embodiment 1 of the present invention. An optical element 11 illustrated in FIG. 1 includes a first optical member L1, a second optical member L2, and an acrylic ultraviolet (UV) curable resin layer (hereinafter, also referred to as "resin layer") NL1 (Nd=1.633, νd=23.0, and θgF=0.68) serving as a third optical member. The third optical member NL1 is formed on one surface (convex surface) of the first optical member L1. The second optical member L2 is cemented onto the resin layer NL1 with a UV curable bonding material S1 (Nd=1.633).

Note that Nd, νd, and θgF denote a refractive index, an Abbe number, and a partial dispersion ratio, respectively. The followings are the same.

An outer region of one surface of the second optical member L2 is coated with ink as a light blocking material (light blocking member) 2 in advance before cementing, and hence a flare or ghost which is caused from an outer region of the resin layer NL1 is suppressed.

In the optical element 11 illustrated in FIG. 1, the outer diameter φr of the resin layer NL1 formed on the surface of the first optical member L1 is 28.5 mm, and the inner diameter (effective region diameter) ϕg of a surface of the second optical member L2 which is cemented to the resin layer NL1 is 27.5 mm.

When the outer diameter ϕr of the resin layer NL1 is set to a value larger than the inner diameter (ϕg of the second optical member L2, an optical element is obtained in which the distortion of the first optical member L1 and the second optical member L2 at the time of cementing is small, no cement peeling occurs under a high-temperature and high-humidity environment, and optical performance is excellent.

Figure 2:
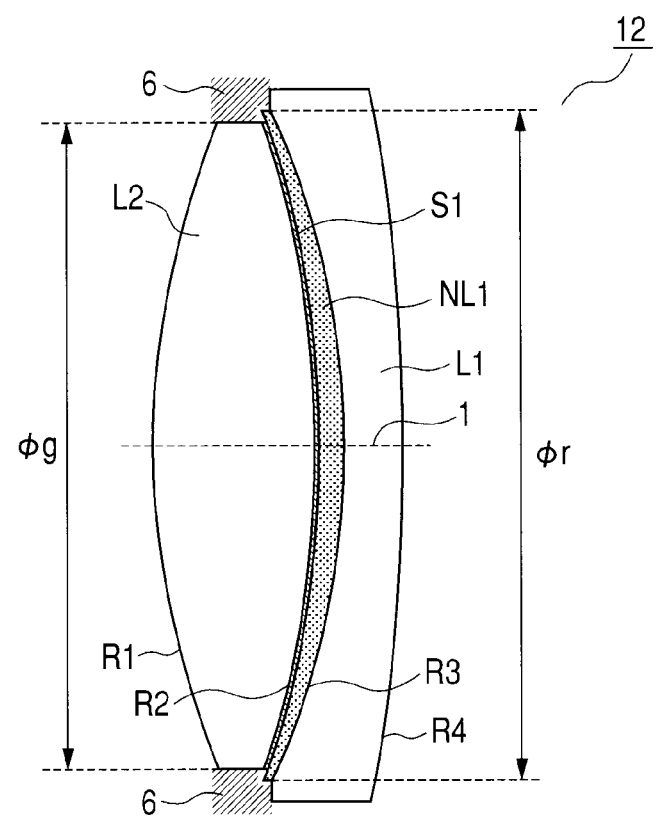
FIG. 2 is a cross-sectional view illustrating an optical element according to Embodiment 2 of the present invention.

FIG. 2 is a principal cross-sectional view illustrating an optical element according to Embodiment 2 of the present invention. In an optical element 12 illustrated in FIG. 2, an N-polyvinyl carbazole resin layer NL1 (Nd=1.696, vd=17.7, and θgF=0.69) is formed as the third optical member on another surface (concave surface) of a first optical member L1. A second optical member L2 is cemented onto the resin layer NL1 with the UV curable bonding material S1 (Nd=1.633).

In the optical element 12 illustrated in FIG. 2, the outer diameter ϕr of the formed resin layer NL1 is 11.6 mm, and the outer diameter (effective region diameter) ϕg of the surface of the second optical member L2 which is cemented to the resin layer NL1 is 11.0 mm.

When the outer diameter ϕr of the resin layer NL1 is set to a value larger than the outer diameter ϕg of the second optical member L2, an optical element is obtained in which the distortion of the first optical member L1 and the second optical member L2 at the time of cementing is small, no cement peeling occurs under a high-temperature and high-humidity environment, and optical performance is excellent.

A light blocking member 6 also serving as a support portion of a lens barrel is provided in an outer region of the optical element 12 of Embodiment 2. Therefore, a flare or ghost which is caused from an outer region of the resin layer NL1 is suppressed.

Figure 3:
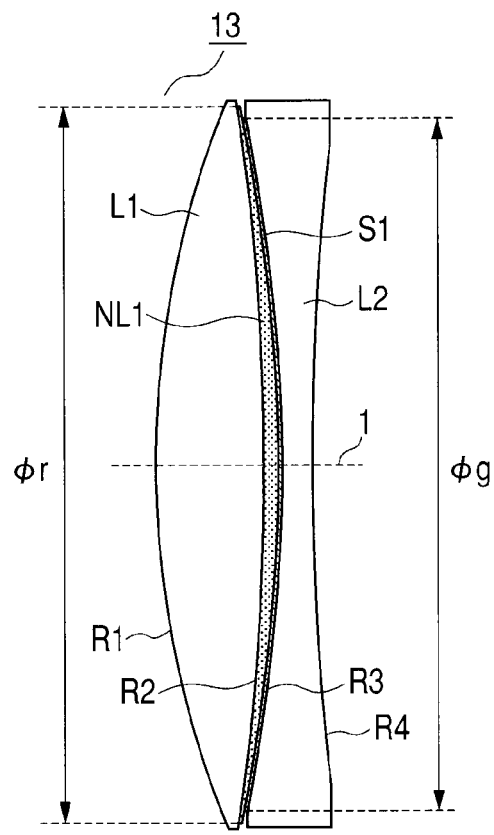
FIG. 3 is a cross-sectional view illustrating an optical element according to Embodiment 3 of the present invention.

FIG. 3 is a principal cross-sectional view illustrating an optical element according to Embodiment 3 of the present invention. In an optical element 13 illustrated in FIG. 3, a UV curable material resin layer NL1 (Nd=1.806, vd=14.9, and θgF=0.74) which is a polymer into which fine particles are dispersed is formed as the third optical member on one surface (convex surface) of a first optical member L1. A second optical member L2 is cemented onto the resin layer NL1 with the same UV curable material resin layer NL1.

The UV curable material is a polymer (refractive index Nd=1.580 and Abbe number vd=37.2) into which $TiO_2$ fine particles are dispersed at a volume ratio of 15%.

In the optical element 13 illustrated in FIG. 3, the outer diameter ϕr of the formed resin layer NL1 is 68.8 mm, and the inner diameter (effective region diameter) ϕg of the surface of the second optical member L2 which is cemented to the resin layer NL1 is 67.8 mm.

When the outer diameter ϕr of the resin layer NL1 is set to a value larger than the inner diameter (ϕg of the second optical member L2, an optical element is obtained in which the distortion of the first optical member L1 and the second optical member L2 at the time of cementing is small, no cement peeling occurs under a high-temperature and high-humidity environment, and optical performance is excellent.

As described above, in the optical element according to each of the embodiments of the present invention, the second optical member L2 is cemented onto the resin layer NL1 which is formed on one of the surfaces of the light incident/exit surfaces of the first optical member L1 with the bonding material S1.

In this case, the outer diameter ϕr of the resin layer NL1 and the effective region diameter ϕg of the surface of the second optical member L2 which is cemented to the resin layer NL1 satisfy Conditional Expression (1) described above.

In each of the embodiments, the optical element may have at least four optical members cemented together.

Next, the effective region diameter ϕg of the cemented surface of the second optical member L2 is described. In general, an optical surface of an optical member (optical member such as lens) is provided with a margin width for a beam effective diameter in an outer region direction in view of assembly margin and assembly error at the time of manufacturing.

A diameter of an effective region for optical performance is the effective region diameter of the optical member. In other words, a finished diameter obtained by extending a surface having a desired spherical shape or aspherical shape to the outer region side at a length longer than the beam effective diameter is the effective region diameter. For example, a polishing diameter of a lens manufactured by polishing corresponds to the effective region diameter. The effective region diameter of the optical member is expressed as an outer diameter or an inner diameter in many cases.

Conditional Expression (1) is a conditional expression for reducing cement distortion when the first optical member L1 on which the resin layer NL1 is formed and the second optical member L2 are cemented to each other and suppressing the occurrences of cement peeling under an environment such as high-temperature and high-humidity.

When Conditional Expression (1) is satisfied, the bonding material S1 is deposited to the resin side surface of the second optical member L2 cemented to the resin layer NL1, and less likely to cause the bonding between the optical members located outside the resin layer NL1.

Figure 15:
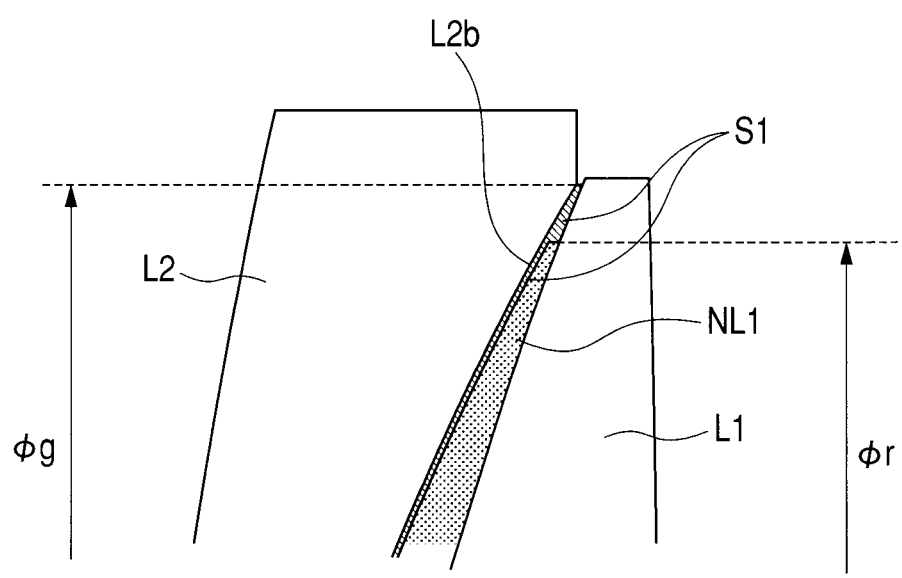
FIG. 15 is an explanatory enlarged cross-sectional view illustrating an outer region of the optical element having the problem to be solved by the present invention.

In contrast to this, when Conditional Expression (1) is not satisfied, the bonding material S1 enters between the optical members located outside the resin layer NL1 as illustrated in FIG. 15. Therefore, the bonding material S1 has a thickness distribution causing cement distortion or cement peeling. This is not desirable.

Note that, when the following condition is set as Conditional Expression (1), the occurrence of cement distortion or cement peeling may be effectively suppressed even in a case where a manufacturing variation is taken into account.

$$\phi g(mm)+0.5(mm)<\phi r(mm) \tag{1a}$$

Assume that a refractive index of the material (resin) of the resin layer NL1 formed on the first optical member L1 with respect to a d line and a refractive index of the bonding material S1 used to cement the second optical member L2 with respect to the d line are expressed by nr and ns, respectively. In this case, the following condition is desirably satisfied.

$$|nr-ns|<0.1 \tag{2}$$

The degree of influence of surface precision of an optical member on optical performance is determined based on the surface precision and a refractive index difference between materials located on both sides of the surface. When the refractive index difference is large, the optical performance may be influenced significantly by a very small change in surface precision.

In contrast to this, when the refractive index difference is small, the change in the surface precision hardly influences the optical performance. Therefore, in particular, in a case where the degree of difficulty of formation is high, such as a case where the resin layer is thick, the refractive index difference between the materials located on both sides of the surface of the resin layer is desirably reduced in order to suppress the influence of the surface precision of the resin layer on the optical performance.

Conditional Expression (2) is a conditional expression for reducing the influence of the surface precision of the formed resin layer NL1 on the optical performance. When the conditional expression is satisfied, excellent optical performance may be easily obtained.

When the following range is set as the range of Conditional Expression (2), more excellent optical performance is easily obtained.

$$|nr-ns|<0.05 \quad (2a)$$

The following range is more desirably set as the range of Conditional Expression (2a).

$$|nr-ns|<0.01 \quad (2b)$$

The bonding material used to cement the resin layer formed on the optical member may be the same.

Assume that a focal length in air of the resin layer NL1 formed on the optical member is expressed by f. In this case, when Conditional Expression (3) described below is satisfied, the effect is more remarkable.

$$f>0.0 \quad (3)$$

The light blocking material 2 is desirably applied to an outer region located outside the region having the effective region diameter $\phi g$ on the cemented side of the second optical member L2 which is cemented to the resin layer NL1 formed on the first optical member L1. Alternatively, when the light blocking member is provided, a flare or ghost which is caused from an end portion of the resin layer NL1 may be suppressed.

This point is described below.

When the resin layer is to be formed on the optical member using a mold and the like, an outermost region of the resin layer is not regulated, and hence the surface of the resin layer is necessarily loose. Therefore, necessary surface precision may not be obtained.

Such a portion is more likely to reflect a beam diffusely to cause a flare or ghost, and thus required to be shielded from the beam. However, it is unsuitable to directly paint the resin layer or coat the resin layer with ink, because the surface of the resin layer does not take paint well.

When the surface of the resin layer is held by a holding ring also serving as the light blocking member, the beam may be blocked. However, the surface of the resin layer is deformed by holding force. This is not desirable.

In contrast to this, when the second optical member is constantly located at a close position in the outer region of the resin layer NL1 as in the case of the optical element according to the present invention, the second optical member is desirably painted or coated with ink to cover the outer region of the resin layer NL1 with respect to the second optical member in a normal manner. This is easily performed.

When the light blocking member 2 is positioned using the second optical member L2, the beam may be blocked while the deformation of the surface of the resin layer is prevented. This is desirable.

When an extraordinary partial dispersion ratio of the resin layer NL1 formed on the first optical member L1 is expressed by $\Delta\theta gFr$, any one of the following conditional expressions is desirably satisfied.

$$0.0272<\Delta\theta gFr \quad (4)$$

$$\Delta\theta gFr<-0.0278 \quad (5)$$

Assume that, the Abbe number $\nu d$, the partial dispersion ratio $\theta gF$, and the extraordinary partial dispersion ratio $\Delta\theta gFr$ are expressed by the following expression where refractive indexes of the material with respect to the g line (wavelength 435.8 nm), the F line (wavelength 486.1 nm), the d line (wavelength 587.6 nm), and the C line (wavelength 656.3 nm) are expressed by Ng, Nd, NF, and NC, respectively. In this case:

$$\nu d=(Nd-1)/(NF-NC)$$

$$\theta gF=(Ng-NF)/(NF-NC)$$

$$\Delta\theta gFr=\theta gF-(-1.665\times10^{-7}\times\nu d^3+5.213\times10^{-5}\times\nu d^2-5.656\times10^{-3}\times\nu d+7.278\times10^{-1}).$$

Conditional Expressions (4) and (5) are conditional expressions related to the extraordinary partial dispersion ratio of the resin layer. When any one of the conditional expressions is satisfied, an optical element having excellent chromatic aberration correction performance is easily obtained.

When the following numerical ranges are set for Conditional Expressions (4) and (5), more excellent chromatic aberration correction performance may be obtained.

$$0.0342<\Delta\theta gFr \quad (4a)$$

$$\Delta\theta gFr<-0.0528 \quad (5a)$$

Specific examples of the resin satisfying Conditional Expression (4) include an acrylic ultraviolet curable resin (Nd=1.633, $\nu d$=23.0, and $\theta gF$=0.68) and N-polyvinyl carbazole (Nd=1.696, $\nu d$=17.7, and $\theta gF$=0.69). The material is not limited to the above-mentioned resins as long as the resin satisfies Conditional Expression (4).

An example of an optical material different in characteristic from a normal glass material is a mixture in which the following inorganic oxide nano-fine-particles are dispersed in a synthetic resin. That is, there are $TiO_2$ (Nd=2.758, $\nu d$=9.54, and $\theta gF$=0.76) and ITO (Nd=1.857, $\nu d$=5.69, and $\theta gF$=0.29).

Among the inorganic oxides, when the fine particles of $TiO_2$ (Nd=2.758, $\nu d$=9.54, and $\theta gF$=0.76) are dispersed in the synthetic resin at a suitable volume ratio, the optical material satisfying Conditional Expression (4) is obtained.

Further, when the fine particles of ITO (Nd=1.857, $\nu d$=5.69, and $\theta gF$=0.29) are dispersed in the synthetic resin at a suitable volume ratio, the optical material satisfying Conditional Expression (5) is obtained.

The material is not limited to the above-mentioned resins as long as the material satisfies Conditional Expressions (4) and (5).

$TiO_2$ is a material employed for various applications, and used as a vapor deposition material for an optical thin film such as an antireflective film in optical fields. The fine particle of $TiO_2$ is used as a photo catalyst, white pigment, or cosmetic material.

ITO is known as a material for a transparent electrode and normally used for a liquid crystal display element and an electroluminescent (EL) element. In addition, ITO is also used for an infrared blocking element and an ultraviolet blocking element.

In each of the embodiments, a desirable average diameter of fine particles dispersed in a resin is approximately 2 nm to 50 nm in consideration of the influence of scattering. In order to suppress coagulation, a dispersant may be added.

A medium material for dispersing the fine particles is desirably polymer. High mass productivity can be obtained by photo polymerization molding or thermal polymerization molding using a molding die.

A dispersion characteristic N(λ) of a mixture in which nano-fine-particles are dispersed can be easily calculated by the following expression derived from the Drude formula which is well known. That is, a refractive index N(λ) at a wavelength λ is expressed by the following expression:

$$N(\lambda)=[1+V\{N\mathrm{par}(\lambda)^2-1\}+(1-V)\{N\mathrm{poly}(\lambda)^2-1\}]^{1/2}$$

where λ denotes an arbitrary wavelength, Npar denotes a refractive index of fine particles, Npoly denotes a refractive index of polymer, and V denotes a total volume fraction of fine particles to a polymer volume.

As described above, according to each of the embodiments of the present invention, the optical element is obtained in which the distortion at the time of cementing is small, the environmental resistance is high, and the optical characteristic and the chromatic aberration correction effect are excellent.

A method of manufacturing the optical element according to each of the embodiments includes the following steps.

(a) A step of depositing an ultraviolet curable resin on a surface of at least one of the first optical member and a mold having a desired shape which are arranged so as to be opposed to each other on the same axis.

(b) A step of pressing one of the first optical member and the mold to the ultraviolet curable resin to be expanded, to thereby form the resin layer.

(c) A step of irradiating the resin layer with ultraviolet light to cure the resin layer.

(d) A step of peeling the mold from the resin layer.

(e) A step of bonding the resin layer formed on the first optical member to the second optical member by the bonding material deposited on the surface of at least one of the resin layer and the second optical member which are arranged so as to be opposed to each other.

Assume that, in the optical element manufactured using the respective steps described above, the outer diameter of the resin layer NL1 is expressed by φg and the effective region diameter of the surface of the second optical member L2 which is cemented to the resin layer is expressed by φr.

This case satisfies the condition of Conditional Expression (1) described above, $$\phi g < \phi r.$$

Next, a forming process (manufacturing method) for the optical element according to the present invention is described with reference to FIGS. 4 to 9.

Figure 4:
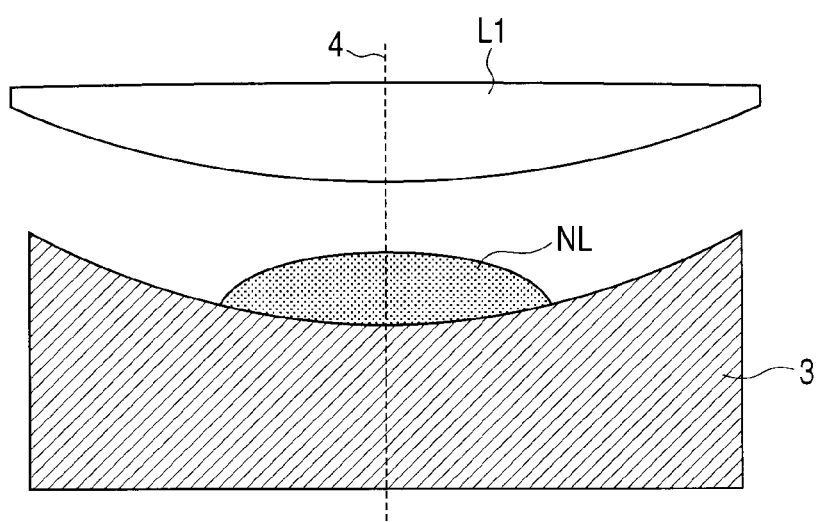
FIG. 4 is an explanatory view illustrating an optical element forming step in the present invention.

FIG. 4 illustrates an axis 4 for the optical member L1 and a mold 3.

As illustrated in FIG. 4, the optical member L1 and the mold 3 are arranged so as to be opposed to each other on the same axis 4. An ultraviolet curable resin NL is deposited on a surface of any one of the optical member L1 and the mold 3 (mold 3 in FIG. 4).

Figure 5:
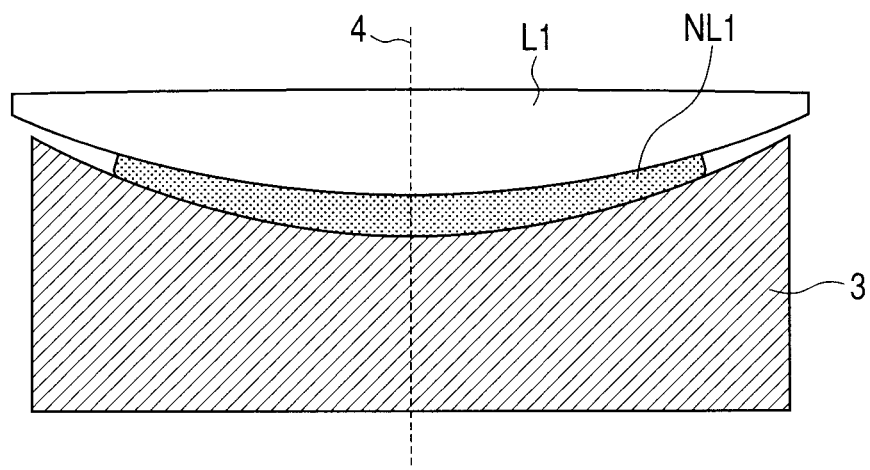
FIG. 5 is an explanatory view illustrating an optical element forming step in the present invention.

Next, as illustrated in FIG. 5, the optical member L1 and the mold 3 are pressed to the ultraviolet curable resin NL to be expanded, to thereby form the resin layer NL1.

Figure 6:
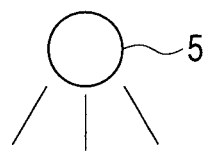
FIG. 6 is an explanatory view illustrating an optical element forming step in the present invention.
Figure 6:
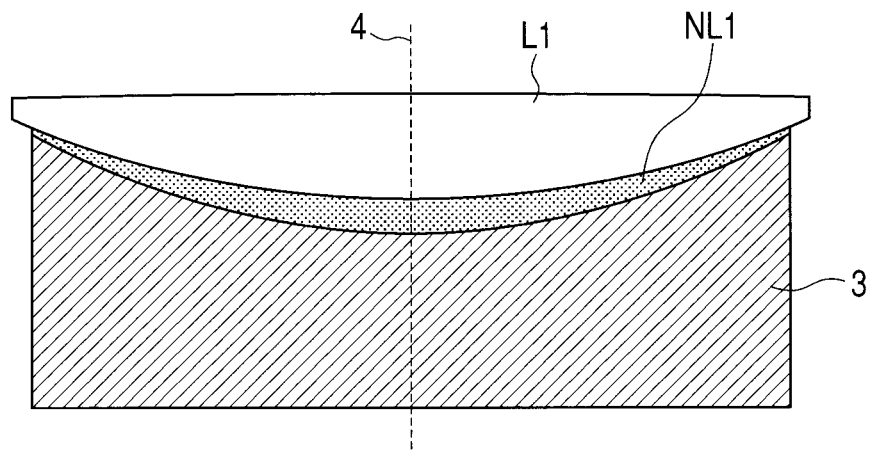

Next, as illustrated in FIG. 6, the resin layer NL1 is sufficiently expanded to have a predetermined curvature. Then, the resin layer NL1 to be cured is irradiated with ultraviolet light or heat ray from a light source unit (energy irradiator) 5.

Figure 7:
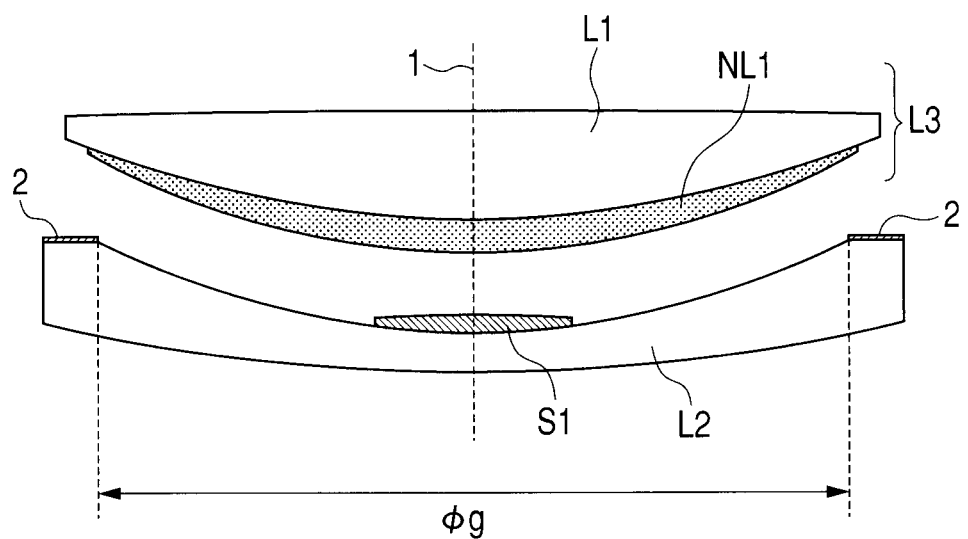
FIG. 7 is an explanatory view illustrating an optical element forming step in the present invention.

Next, the ultraviolet curable resin layer NL1 is released from the mold 3. After that, as illustrated in FIG. 7, an optical member L3 in which the optical member L1 and the resin layer NL1 are stacked and the resin layer NL1 is located on the surface of the optical member L1 is arranged so as to be opposed to the second optical member L2. The bonding material S1 is deposited on the surface of any one of the optical members L2 and L3. In this case, as illustrated in FIG. 7, the light blocking material 2 may be applied in advance to an outer region located outside a region having the inner diameter φg of the surface of the second optical member L2 which is opposed to the resin layer NL1.

Figure 8:
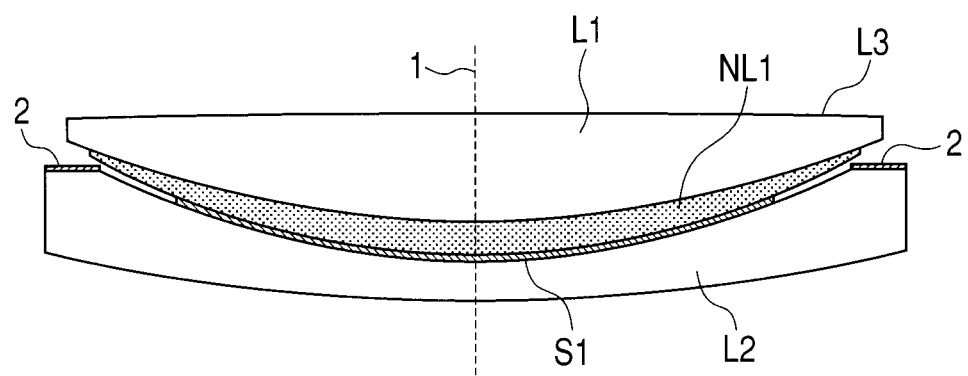
FIG. 8 is an explanatory view illustrating an optical element forming step in the present invention.

Next, as illustrated in FIG. 8, the optical members L2 and L3 are pressed to the bonding material S1 to expand the bonding material S1.

Figure 9:
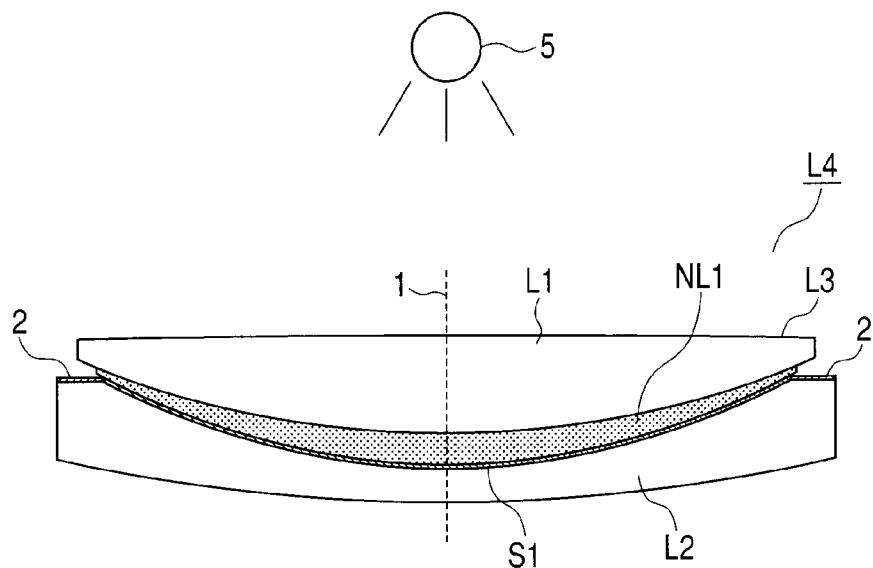
FIG. 9 is an explanatory view illustrating an optical element forming step in the present invention.

Next, as illustrated in FIG. 9, the eccentricity of the optical members L2 and L3 is adjusted, and then the bonding material S1 to be cured is irradiated with ultraviolet light or heat ray from the light source unit 5 to obtain an optical element L4 having a desired shape.

As described above, according to the embodiments of the present invention, the optical element may be manufactured in which the distortion at the time of cementing is small, the environmental resistance is high, and the optical characteristic and the chromatic aberration correction effect are excellent.

Hereinafter, specific Numerical Examples 1 to 3 corresponding to the optical elements according to Embodiments 1 to 3 of the present invention are described. In the respective numerical examples, a surface number "i" is counted from the object side of each of the optical elements. In the numerical examples, Ri denotes a curvature radius of an i-th optical surface (i-th surface) and Di denotes an axial interval between the i-th surface and an (i+1)-th surface.

In addition, Ndi, νdi, and θgFi denote a refractive index, Abbe number, and partial dispersion ratio of a material of an i-th optical member with respect to the d line, respectively.

A beam effective diameter of the i-th optical surface (i-th surface) and effective region diameters (outer diameter or inner diameter) for effective optical performance of the i-th optical member are also listed. The listed effective region diameters are an object-side effective region diameter and an image-side effective region diameter.

When a displacement amount from a surface vertex in the optical axis direction is expressed by X, a height from the optical axis in a direction perpendicular to the optical axis is expressed by h, a paraxial curvature radius is expressed by R, a conic constant is expressed by k, and aspherical coefficients of respective orders are expressed by B, C, D, E, and the like, an aspherical surface shape is expressed as follows.

$$x(h) = \frac{(1/R)h^2}{1+\sqrt{\left\{\frac{1-(1+k)}{(h/R)^2}\right\}}} + Bh^4 + Ch^6 + Dh^8 + Eh^{10}\ldots \quad <\text{Expression 1}>$$

Note that "E±XX" in each of the aspherical coefficients indicates "×10±XX". Further, the relation between each Conditional Expression and each Embodiment is shown in Table 4.

In Numerical Example 3, an optical element made of a resin layer in which $TiO_2$ fine particles are dispersed at a volume ratio of 15% in an ultraviolet curable resin which is a host polymer is used. Refractive indexes of $TiO_2$ fine particle dispersion materials are calculated based on the values obtained by calculation using the Drude formula as described above.

Table 5 exhibits optical characteristics of the material of the resin layer used in each of the embodiments. Table 6 exhibits optical characteristics of a host polymer of a fine particle dispersion material and optical characteristics of a $TiO_2$ fine particle, which are used in Embodiment 3.

TABLE 1

Numerical Example 1
f = 264.3

| Surface number | R | D | Nd | vd | θgF | Beam effective diameter | Object-side effective region diameter (outer diameter or inner diameter) | Image-side effective region diameter (outer diameter or inner diameter) |
|---|---|---|---|---|---|---|---|---|
| 1 | 65.539 | 1.50 | 1.84666 | 23.9 | 0.620 | 30.5 | 32.5 | 27.5 |
| 2 | 28.776 | 1.40 | 1.63272 | 23.0 | 0.675 | 27.0 | 28.5 | 28.5 |
| 3 | 40.702 | 4.60 | 1.48749 | 70.3 | 0.530 | 27.0 | 31.0 | 31.0 |
| 4 | −274.859 | | | | | 27.0 | | |

TABLE 2

Numerical Example 2
f = 27.7

| Surface number | R | D | Nd | vd | θgF | Beam effective diameter | Object-side effective region diameter (outer diameter or inner diameter) | Image-side effective region diameter (outer diameter or inner diameter) |
|---|---|---|---|---|---|---|---|---|
| 1* | 14.517 | 2.80 | 1.48749 | 70.3 | 0.530 | 9.6 | 11.0 | 11.0 |
| 2 | −16.440 | 0.40 | 1.69590 | 17.7 | 0.685 | 9.5 | 11.6 | 11.6 |
| 3 | −13.343 | 1.00 | 1.84666 | 23.9 | 0.620 | 9.4 | 11.6 | 12.6 |
| 4 | −31.496 | | | | | 9.5 | | |

Aspherical coefficient

| Conic constant (K) k | Fourth-order coefficient (B) B | Sixth-order coefficient (C) C | Eighth-order coefficient (D) D | Tenth-order coefficient (E) E |
|---|---|---|---|---|
| First surface 0.000000E+00 | 9.959870E−06 | 4.456760E−07 | −1.749280E−09 | 1.829960E−11 |

TABLE 3

Numerical Example 3
f = 359.6

| Surface number | R | D | Nd | vd | θgF | Beam effective diameter | Object-side effective region diameter (outer diameter or inner diameter) | Image-side effective region diameter (outer diameter or inner diameter) |
|---|---|---|---|---|---|---|---|---|
| 1 | 93.465 | 10.70 | 1.60311 | 60.7 | 0.542 | 67.9 | 70.0 | 70.0 |
| 2 | −245.809 | 1.55 | 1.80611 | 14.9 | 0.738 | 66.9 | 68.8 | 68.8 |
| 3 | −160.637 | 3.40 | 1.84666 | 23.9 | 0.620 | 66.8 | 67.8 | 64.6 |
| 4 | 301.986 | | | | | 63.6 | | |

TABLE 4

| | Embodiment 1 | Embodiment 2 | Embodiment 3 |
|---|---|---|---|
| φr | 28.5 | 11.6 | 68.8 |
| φg | 27.5 | 11.0 | 67.8 |
| nr | 1.63272 | 1.69591 | 1.80611 |
| ns | 1.62959 | 1.62959 | 1.80611 |
| \|nr − ns\| | 0.00313 | 0.06632 | 0.00000 |
| f | 148.5 | 96.7 | 570.5 |
| ΔθgFr | 0.052 | 0.042 | 0.083 |

TABLE 5

| | Embodiment 1 Acrylic UV curable resin | Embodiment 2 N-polyvinyl carbazole | Embodiment 3 TiO$_2$ 15%-UV curable resin |
|---|---|---|---|
| d line refractive index | 1.63272 | 1.69591 | 1.80611 |
| g line refractive index | 1.67117 | 1.75164 | 1.88606 |
| C line refractive index | 1.62517 | 1.68528 | 1.79203 |
| F line refractive index | 1.65264 | 1.72465 | 1.84614 |
| vd | 23.0 | 17.7 | 14.9 |
| θgF | 0.675 | 0.686 | 0.738 |

TABLE 6

| | UV curable resin | TiO$_2$ |
|---|---|---|
| d line refractive index | 1.57980 | 2.75753 |
| g line refractive index | 1.60010 | 3.03431 |
| C line refractive index | 1.57530 | 2.71051 |
| F line refractive index | 1.59090 | 2.89478 |
| vd | 37.2 | 9.5 |
| θgF | 0.590 | 0.757 |

Next, an optical system including the optical element according to the present invention is described.

Figure 10:
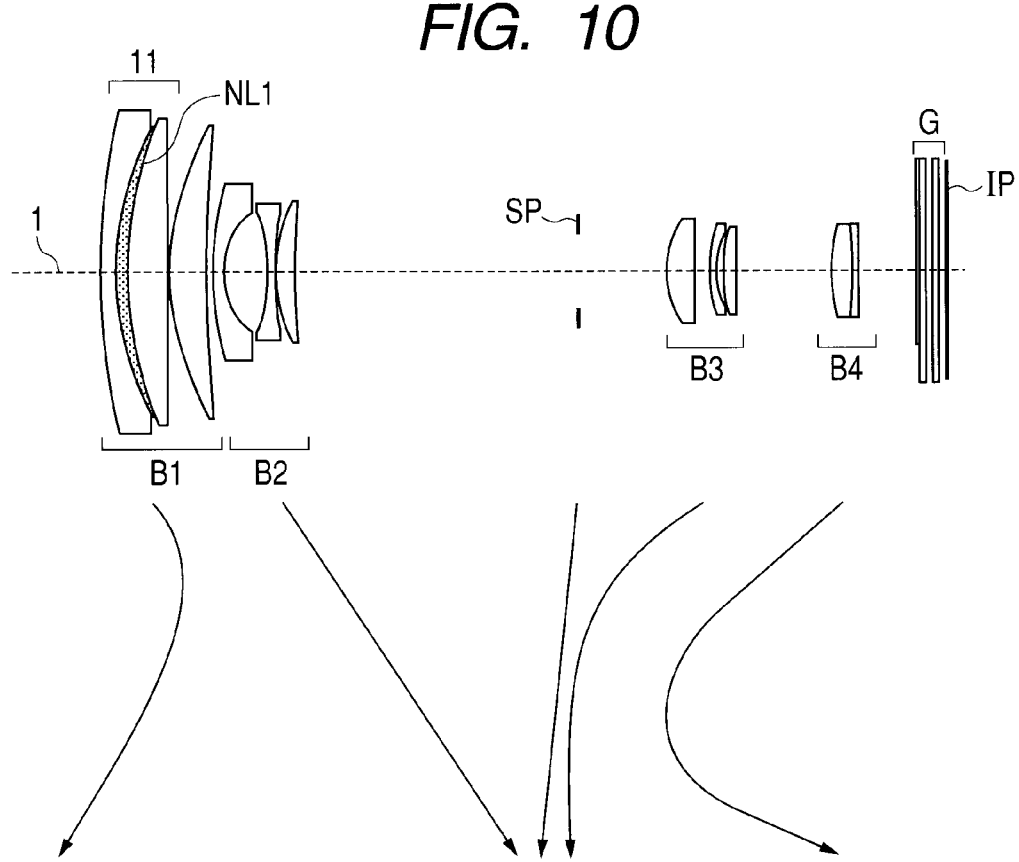
FIG. 10 is a cross-sectional view illustrating an optical system using the optical element according to Embodiment 1 of the present invention.

FIG. 10 is a lens cross-sectional view illustrating a zoom lens including the optical element according to Embodiment 1 of the present invention at the wide-angle end.

In FIG. 10, the left is the object side (front side) and the right is the image side (rear side). In FIG. 10, a lens unit order counted from the object side is denoted by "i" and an i-th lens unit is denoted by Bi.

In FIG. 10, a first lens unit B1 has a positive optical power ("optical power"="reciprocal of focal length"), a second lens unit B2 has a negative optical power, a third lens unit B3 has a positive optical power, and a fourth lens unit B4 has a positive optical power.

An aperture stop SP is provided on the object side of the third lens unit B3. An optical block G corresponds to an optical filter, a face plate, a quartz low-pass filter, or an infrared cut filter.

An image plane IP is provided. When the zoom lens is used as an image taking optical system of a video camera or a digital still camera, the image plane IP corresponds to an image pickup surface of a solid-state image pickup element (photoelectric transducer) such as a CCD sensor or a CMOS sensor. In a case of a silver-halide film camera, a photosensitive surface corresponding to a film surface thereof is provided as the image plane IP.

In the zoom lens, as illustrated by arrows, the respective lens units and the aperture stop SP are moved during zooming from the wide-angle end to the telephoto end.

Specifically, during zooming from the wide-angle end to the telephoto end, the first lens unit B1 is moved to the image side and then moved to the object side. The second lens unit B2 is moved to the image side. The third lens unit B3 is moved along a part of a locus convex to the object side. The fourth lens unit B4 is moved along a locus convex to the object side. The aperture stop SP is moved to the object side without depending on the movement of the respective lens units.

The zoom lens illustrated in FIG. 10 has a zoom ratio of 16 and an F number in a range of approximately 2.9 to 4.0. The optical element 11 according to Embodiment 1 is used for the first lens unit B1 of the zoom lens. Therefore, the chromatic aberration may be excellently corrected mainly on the telephoto side, and hence the obtained zoom lens has the entire system which is compact and has high performance. In addition, a variation in optical performance of the obtained zoom lens under various environments is small.

Figure 11:
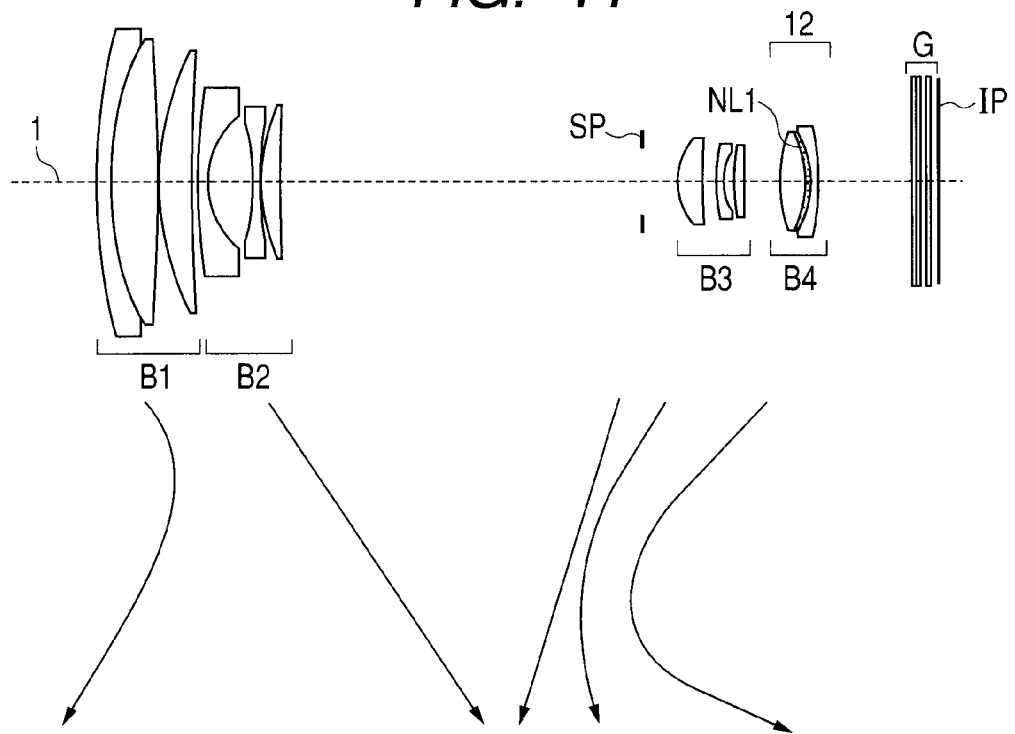
FIG. 11 is a cross-sectional view illustrating an optical system using the optical element according to Embodiment 2 of the present invention.

FIG. 11 is a lens cross-sectional view illustrating a zoom lens including the optical element according to Embodiment 2 of the present invention at the wide-angle end.

The zoom lens illustrated in FIG. 11 has the same zoom type as the zoom lens illustrated in FIG. 10.

The zoom lens has a zoom ratio of 1.5 and an F number in a range of approximately 2.9 to 3.6. The optical element 12 according to Embodiment 2 is used for the fourth lens unit B4 of the zoom lens. Therefore, the lateral chromatic aberration may be excellently corrected mainly on the wide-angle side, and hence the obtained zoom lens has the entire system which is compact and has high performance. In addition, a variation in optical performance of the obtained zoom lens under various environments is small.

Figure 12:
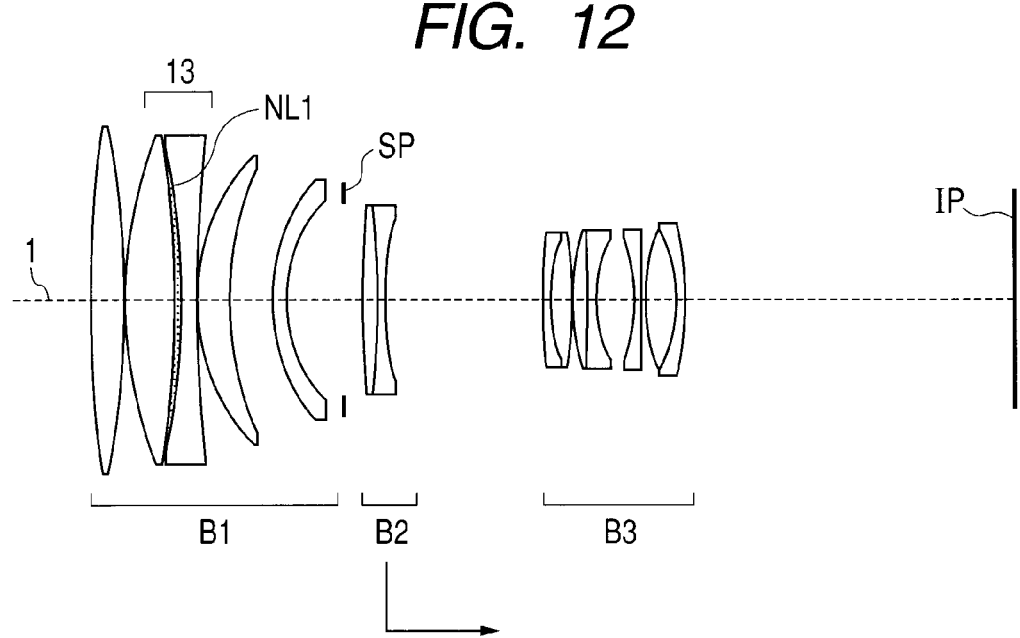
FIG. 12 is a cross-sectional view illustrating an optical system using the optical element according to Embodiment 3 of the present invention.

FIG. 12 is a lens cross-sectional view illustrating a telephoto lens including the optical element according to Embodiment 3 of the present invention. The telephoto lens illustrated in FIG. 12 includes a first lens unit B1 having a positive optical power, a second lens unit B2 having a negative optical power, and a third lens unit B3. The aperture stop SP and the image plane IP are provided.

During focusing from an infinitely distant object to a nearest object at the telephoto end, the second lens unit B2 is moved to the image side as illustrated by an arrow.

The telephoto lens has a focal length of 300 mm and an F number of 4.0. The optical element 13 according to Embodiment 3 is provided on the image side of the aperture stop SP of the telephoto lens. Therefore, the chromatic aberration may be excellently corrected, and hence the obtained zoom lens is compact and has high performance while achieving a telephoto ratio of 0.68. In addition, a variation in optical performance of the obtained telephoto lens (optical system) under various environments is small.

Next, a digital still camera (image pickup apparatus) which uses the optical system according to the present invention as an image taking optical system and corresponds to an optical apparatus according to the present invention including the optical system, is described with reference to FIG. 13.

Figure 13:
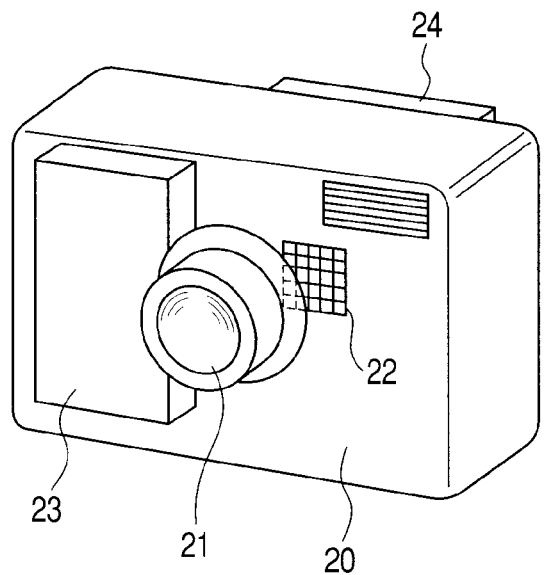
FIG. 13 is a principal schematic view illustrating an image pickup apparatus in the present invention.
Figure 14:
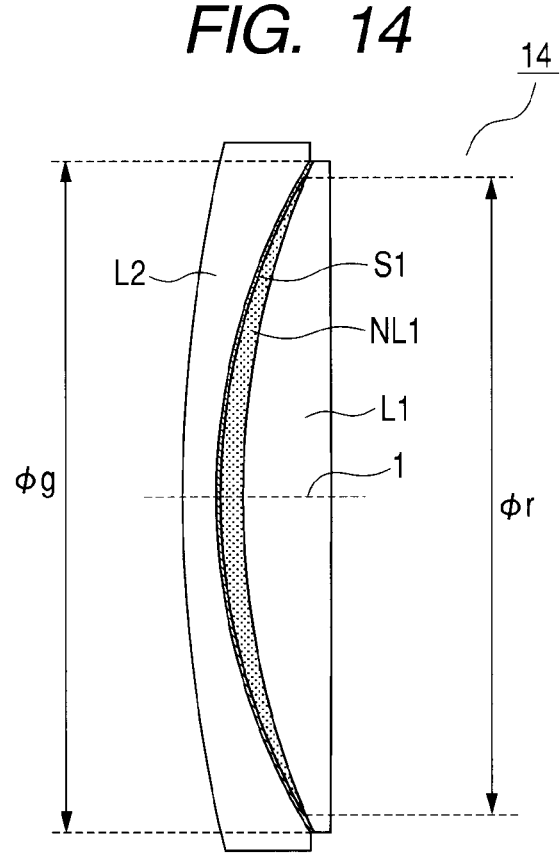
FIG. 14 is an explanatory cross-sectional view illustrating an optical element having a problem to be solved by the present invention.

In FIG. 13, the digital still camera includes a camera main body 20 and an image taking optical system 21. The image taking optical system 21 includes the optical system according to the present invention. A solid-state image pickup element (photoelectric transducer) 22 such as a CCD sensor or a CMOS sensor is integrated in the camera main body 20 and receives a subject image formed by the image taking optical system 21. A memory 23 stores information corresponding to the subject image subjected to photoelectric conversion by the solid-state image pickup element 22. A finder 24 includes a liquid crystal display panel and is used to observe the subject image formed on the solid-state image pickup element 22.

As described above, when the optical system according to the present invention is applied to an image pickup apparatus such as the digital still camera, an image pickup apparatus which is small in size and has high optical performance is realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-289649, filed Nov. 12, 2008, which is hereby incorporated by reference herein in its entirety.

What is claimed is:

1. An optical element comprising:
a first optical member;
a resin layer formed on the first optical member;
a second optical member having a surface cemented to the resin layer; and
a bonding material cementing the second optical member to the resin layer,
wherein the resin layer has a positive optical power and a meniscus shape, and
wherein the following condition is satisfied:

$$\phi g < \phi r,$$

where $\phi r$ indicates an outer diameter of the resin layer and $\phi g$ indicates an effective region diameter of the surface of the second optical member cemented to the resin layer.

2. An optical element according to claim 1, wherein the following condition is satisfied:

$$|nr - ns| < 0.1,$$

where nr indicates a refractive index of a material of the resin layer with respect to a d line and ns indicates a refractive index of a material of the bonding material with respect to the d line.

3. An optical element according to claim 1, further comprising one of an applied light blocking material or a light blocking member provided in an outer region located outside a region having the effective region diameter φg on a side of the second optical member cemented to the resin layer.

4. An optical element according to claim 1, wherein one of the following conditions is satisfied:

$$0.0272 < \Delta\theta gFr;$$

or $$\Delta\theta gFr < -0.0278,$$

where ΔθgFr indicates an extraordinary partial dispersion of the material of the resin layer.

5. An optical element according to claim 1, wherein the first and second optical members are made of glass.

6. An optical system comprising:
a first optical member;
a resin layer formed on the first optical member;
a second optical member having a surface cemented to the resin layer; and
a bonding material cementing the second optical member to the resin layer,
wherein the resin layer has a positive optical power and a meniscus shape, and
wherein the following condition is satisfied:

$$\phi g < \phi r;$$

where φr indicates an outer diameter of the resin layer and φg indicates an effective region diameter of the surface of the second optical member cemented to the resin layer,
wherein the optical system forms an image on a photoelectric transducer.

7. An optical system according to claim 6, wherein the first and second optical members are made of glass.

8. An optical apparatus comprising:
an optical system and
a photoelectric transducer for receiving an image formed by the optical system,
wherein the optical system includes:
a first optical member;
a resin layer formed on the first optical member;
a second optical member having a surface cemented to the resin layer; and
a bonding material cementing the second optical member to the resin layer,
wherein the resin layer has a positive optical power and a meniscus shape, and
wherein the following condition is satisfied:

$$\phi g < \phi r;$$

where φr indicates an outer diameter of the resin layer and φg indicates an effective region diameter of the surface of the second optical member cemented to the resin layer.

9. An optical apparatus according to claim 8, wherein the first and second optical members are made of glass.

10. A method of manufacturing an optical element, the method comprising the steps of:
depositing an ultraviolet curable resin on a surface of a first optical member;
pressing the first optical member to the ultraviolet curable resin to be expanded with a mold, to thereby form a resin layer;
irradiating the resin layer with ultraviolet light to cure the resin layer;
peeling the mold from the resin layer; and
bonding the resin layer formed on the first optical member to a second optical member with a bonding material deposited on the surface of at least one of the resin layer or the second optical member, which is opposed to the resin layer,
wherein the resin layer has a positive optical power and a meniscus shape, and
wherein the following condition is satisfied:

$$\phi g < \phi r;$$

where φr indicates an outer diameter of the resin layer and φg indicates an effective region diameter of a surface of the second optical member which is cemented to the resin layer.

11. An optical element comprising:
a first optical member;
a resin layer formed on the first optical member;
a second optical member having a surface cemented to the resin layer; and
a bonding material cementing the second optical member to the resin layer,
wherein the first and second optical members are made of glass, and
wherein the following condition is satisfied:

$$\phi g < \phi r;$$

where φr indicates an outer diameter of the resin layer and φg indicates an effective region diameter of the surface of the second optical member cemented to the resin layer.

12. An optical element according to claim 11, wherein the following condition is satisfied:

$$|nr-ns| < 0.1,$$

where nr indicates a refractive index of a material of the resin layer with respect to a d line and ns indicates a refractive index of a material of the bonding material with respect to the d line.

13. An optical element according to claim 11, wherein the following condition is satisfied:

$$f > 0.0,$$

where f indicates a focal length in air of the resin layer.

14. An optical element according to claim 11, further comprising one of an applied light blocking material or a light blocking member, provided in an outer region located outside a region having the effective region diameter φg on a side of the second optical member cemented to the resin layer.

15. An optical element according to claim 11, wherein one of the following conditions is satisfied:

$$0.0272 < \Delta\theta gFr;$$

or $$\Delta\theta gFr < -0.0278,$$

where ΔθgFr indicates an extraordinary partial dispersion of the material of the resin layer.

16. An optical element according to claim 11, wherein the resin layer has a positive optical power.

17. An optical element according to claim 11, wherein the resin layer has a positive meniscus shape.

* * * * *